United States Patent
Peak

[15] 3,699,753
[45] Oct. 24, 1972

[54] QUICK-ADJUSTABLE LOWER STOP FOR FEEDER HOUSE DRUM

[72] Inventor: Charles Benjamin Peak, Geneseo, Ill.

[73] Assignee: Deere & Company, Moline, Ill.

[22] Filed: Jan. 31, 1972

[21] Appl. No.: 221,998

[52] U.S. Cl. ................................................56/14.5
[51] Int. Cl. .......................A01d 41/02, A01d 45/02
[58] Field of Search..........56/14.5, 16.6, 10.2, 320.1, 56/51, 181, 158

[56] References Cited

UNITED STATES PATENTS 3,470,681   10/1969   Saemann ................56/14.5 X
3,609,947   10/1971   Herbsthofer................56/10.2

*Primary Examiner*—Louis G. Mancene
*Assistant Examiner*—J. N. Eskovitz
*Attorney*—H. Vincent Harsha et al.

[57] ABSTRACT

The lower stop for a combine feeder house drum can be rotated to present either one of a pair of stop surfaces which are positioned unequal distances from the axis of rotation of the stop so that by rotation of the stop member, the minimum clearance of the drum with respect to the bottom wall of the feeder house can be easily varied for small grain and corn. The lower drum stop is also carried by a rotatable cam which can be used to provide fine adjustments for the feeder house lower drum stop.

12 Claims, 3 Drawing Figures

QUICK-ADJUSTABLE LOWER STOP FOR FEEDER HOUSE DRUM

BACKGROUND OF THE INVENTION

The present invention relates generally to agricultural combines, and more particularly relates to improvements in the lower stop for a combine feeder house drum.

The feeder house takes the material from a grain platform or cornhead and delivers it to the cylinder for threshing. To accomplish this, the feeder house contains an endless conveyor with cross slats that operate a short distance above the feeder house bottom wall to convey material between the feeder house bottom wall and the slats. The forward end of the endless conveyor is trained about a drum at the opening in the front of the feeder house and the drum is hinged to accommodate varying amounts of material entering the feeder house. Upper and lower stops on each side of the feeder house restrict the drum movement to maintain clearance between the conveyor cross slats and the top and bottom walls of the feeder house.

Harvesting of certain crops such as corn and soybeans is done at approximately the same time of the year and often at different periods of the same day due to different optimum moisture requirements. However, feeding conditions vary from small grain to corn. For example, for small grain the conveyor cross slats at the bottom of the drum should operate approximately one-eighth of an inch off the bottom wall of the feeder house if all the grain is to be conveyed to the cylinder. When combining corn, the material conveyed to the feeder house is more bulky, the diameter of ears of corn being two inches or more. Thus, when combining corn, an increase in the minimum clearance between the cross slats at the bottom of the drum and the feeder house bottom wall will result in improved feeding, will reduce the wear on hinge parts, and will reduce the impact on both upper and lower stops.

SUMMARY OF THE INVENTION

The principal object of the present invention is to provide a quick-adjustable lower stop for a combine feeder house drum.

Another object of the present invention is to provide a lower stop for a combine feeder house drum which can be quickly adjusted when moving from small grain to corn or vice versa without destroying the setting for small grain. 31 A more specific object of the invention is to provide a lower stop for a feeder house drum, which is rotatable and has a pair of stop surfaces spaced unequal distances from the axis of rotation of the stop, and which is supported by a rotatable cam which provides fine adjustments for the stop.

The above objects and additional objects and advantages of the present invention will become apparent to those skilled in the art from a reading of the following detailed description when taken in conjunction with the accompanying drawings.

DESCRIPTION OF THE PREFERRED EMBODIMENT

Figures 1, 2, 3:
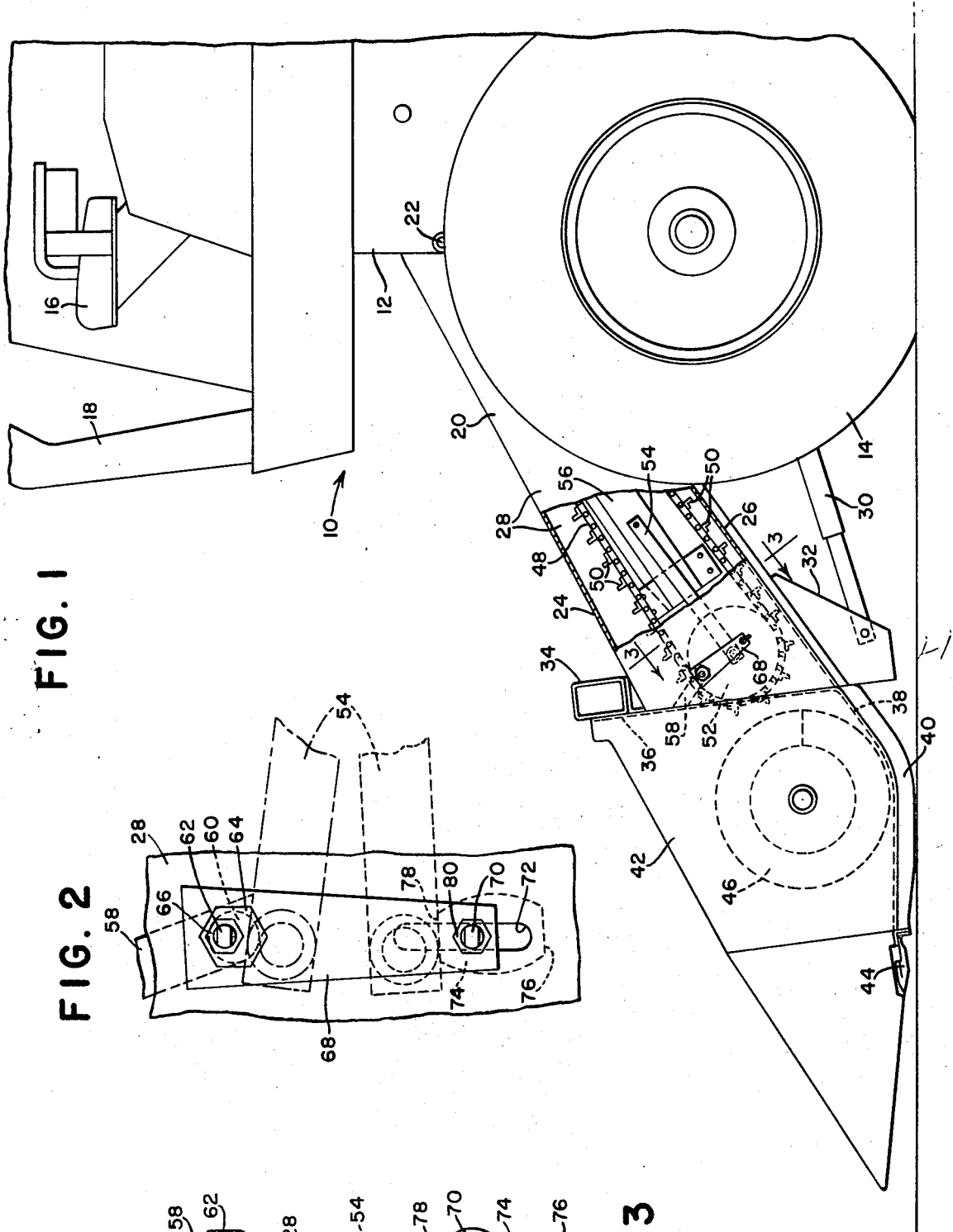
FIG. 1 is a side elevational view of the forward portion of a combine, parts being broken away to illustrate hidden parts.
FIG. 2 is an enlarged side view of a portion of the combine illustrated in FIG. 1; and, FIG. 3 is a sectional view taken substantially along the line 3—3 of FIG. 1.

Referring now to the drawings, a combine indicated in its entirety by the numeral 10 includes a main separator body 12 supported on wheels 14. The illustrated combine or grain harvesting implement is of the self-propelled type and includes an operator's station including a seat 16 and a steering console 18. The illustrated combine is of a conventional type and further details are unnecessary for a complete understanding of the invention.

A feeder housing 20 has its rear end pivotally connected to the main separator body for movement in a vertical plane about a pivot 22. The feeder house includes a top wall 24, a bottom wall 26 and side walls 28. Hydraulic cylinders 30 act between the main body 12 and brackets 32 secured to the bottom wall of the feeder house to raise and lower the forward end of the feeder house about the pivot 22.

A grain platform is secured to the forward end of the feeder house and includes a main transverse beam 34, a rear wall 36, a bottom wall 38, bottom reinforcement members 40, side walls 42, a forward cutter bar 44 and an auger 46 having its opposite ends journaled in the side walls 42. As is conventional, the rear wall 36 of the grain platform has an opening in communication with the forward end of the feeder house for the transfer of material to the feeder house. Although not specifically illustrated in the drawing, the connection between the feeder house and grain platform is preferably of the quick-connection type such as that illustrated in U. S. reissue Pat. No. 26,512 which issued to G. W. Rohwedder on Dec. 31, 1968 so that it can be easily disconnected from the feeder house and the feeder house connected to a conventional cornhead as is well understood by those skilled in the art.

An endless conveyor is mounted in the feeder house to provide a passage between the bottom flight of a conveyor and the bottom wall of the feeder house for the transfer of grain from the grain platform to the main separating body of the combine and includes endless flexible chains 48 interconnected by cross slats 50. The rear portions of the chains 48 are trained about driving sprockets rotatable about an axis coaxial with the shaft 22 and the forward portions of the chains 48 are trained about a feeder house drum 52. The opposite ends of the drum 52 are rotatably supported on the forward ends of arms 54 which have their rear ends pivotally connected to a conveyor support 56 so that the drum 52 is free to move toward and away from the bottom wall 26 of the feeder house to decrease and increase, respectively, the minimum distance between the slats 50 at the bottom of the drum 52 and the bottom wall 26 of the feeder house to accommodate varying amounts of material entering the feeder house.

To prevent the conveyor slats 50 from rubbing against the top and bottom walls of the feeder house, it is necessary to provide upper and lower stops which determine the maximum and minimum size of the passage between the conveyor and the bottom wall of the feeder house. Such stops are provided on both sides of the feeder house, but are of identical construction so only one will be described. The upper stop takes the form of a rigid strap 58 secured to the side wall of the feeder house in the path of movement of the pivot arm 54 so as to be contacted thereby and limit the upward movement of the pivot arm 54. Since it is desirable that the feeder house drum be free to pivot upwardly its maximum amount at all times to accommodate slugs of crop material which may enter the feeder house, the upper stop 58 has no adjustment.

The top stop includes a circular cam member 60 eccentrically and rotatably mounted on a bolt 62 which extends through the lowermost portion of the upper stop strap 58 and the side wall 28 of the feeder house. The cam 60 is provided with a hexagonal flange 64 which permits easy adjustment of the cam with a conventional wrench. A nut 66 on the bolt 62 releasably clamps the cam 60 against the side wall 28 to normally prevent rotation of the cam 60. The extreme outer end of the bolt 62 is flattened on opposite sides to receive a wrench which will prevent rotation of the bolt 62 when the nut 66 is tightened or loosened.

A link 68 is provided with a circular aperture near one end which receives the circular cam 60 so that the link 68 is suspended from the cam 60 and will be moved toward and away from the bottom wall 26 of the feeder house upon rotation of the cam 60. At its lower end, the link 68 rotatably carries a bolt 70 which extends through an elongated aperture 72 provided in the side wall 28. A stop member 74 is nonrotatably mounted on the bolt 70 interiorly of the housing 70 and in the path of movement of the arm 54 to determine the lower most position of the arm 54 and hence the minimum size of the passage between the endless conveyor and the bottom wall 26. The stop member 74 is provided with high and low stop surfaces 76 and 78, respectively, which, depending upon the position of the stop member 74, will alternately engage the pivot arm 54. A nut 80 on the outer end of the bolt 70 releasably clamps the link 68, the side wall 28 and the stop member 74 together to normally prevent rotation of the stop member 74. The outer end of the bolt 70 is provided with a pair of opposed flat surfaces which will receive a wrench to provide easy rotation or adjustment of the stop member 74.

The operation of the above-described stop mechanism is as follows. When the grain platform is attached to the feeder house, the stop member 74 is rotated so that the low stop surface 78 engages the pivot arm 54 which serves as an abutment member movable with the drum 52 to determine the maximum and minimum sizes of the passage between the endless conveyor and bottom wall 26. The cam 60 is then rotated until the distance between the slats at the bottom of the drum 52 and the bottom wall 26 is approximately one-eighth of an inch. The nuts 66 and 80 are then tightened to lock the cam 60 and stop member 74 in their adjusted positions. When the grain platform is detached from the feeder house and the feeder house attached to a cornhead, the nut 80 is loosened and the bolt 70 and stop member 74 are rotated through 180° so that the high stop surface 76 will engage the pivot arm 54. This has the effect of increasing the minimum size of the passage between the endless conveyor and the bottom wall 26 to approximately 1 inch so that the ears of corn entering the feeder house do not have to lift the forward drum through this distance before moving into the passage. When the feeder house is attached to the cornhead, no adjustment is made with the adjusting member or cam 60 so that the proper setting for small grain is not destroyed.

By providing the adjustment to increase or decrease the size of passage between the endless conveyor and bottom wall 26, feeding the corn through the passage is improved, there will be less movement of the hinge parts with the result that wear on the hinge parts is reduced, and impact on both upper and lower stops as the drum 52 moves up and down is reduced.

Although only a single preferred embodiment of the invention has been described and illustrated, various modifications within the spirit and scope of the invention will become apparent to those skilled in the art and can be made without departing from the underlying principles of the invention. Therefore, the invention should not be limited by the specific illustration and description, but only by the following claims.

I claim

1. In a harvesting implement including a main separating body with a forward crop inlet opening, a feeder house having a forward crop inlet opening and a rear crop discharge opening, means mounting the feeder house on the main separator body for vertical pivotal movement about its rear end with its rear crop discharge opening in communication with the crop inlet opening in the main separator body, crop gathering means having a rear discharge opening and mounted on the feeder house with its rear discharge opening in communication with the feeder house crop inlet opening, endless conveyor means mounted in the feeder house and extending from the crop inlet opening to the crop discharge opening for conveying crop material along a passage defined between the conveying means and a bottom wall of the feeder house, at least the forward portion of the conveying means being movable toward and away from the bottom wall to decrease or increase, respectively, the size of the passage, the improvement comprising: abutment means connected to and movable with the forward end of the conveying means; rotatable pin means extending through an aperture provided in a side wall of the feeder house; block means nonrotatably mounted on the pin means interiorly of the feeder house and in the path of movement of the abutment means; the block means having a peripheral stop surface with areas located unequal distances from the axis of rotation of the pin means; and releasable fastener means cooperably among the pin means; and releasable fastener means cooperable among the pin means and the side wall of the feeder house to normally prevent rotation of the pin means, whereby, releasing the fastener means and rotating the pin means a selected one of the stop surfaces on the block means will engage the abutment means to determine the minimum size of the passage.

2. A combination as set forth in claim 1 wherein a circular cam member is rotatably and eccentrically mounted on a side wall of the feeder house, an interconnecting link is provided with a circular aperture which receives the cam member so that upon rotation of the cam member the link moves toward and away from the bottom wall of the feeder house; and the pin means is rotatably carried by the link and extends through an elongated aperture in the side wall of the feeder house.

3. In a feeder house including means at its rear end for pivotal connection to the main separator body of a crop harvesting implement, means at its forward end for alternate connection to and for supporting a grain platform and a cornhead, conveyor means extending from one end of the feeder house to the other and mounted therein to define a crop passage between the conveyor means and a bottom wall of the feeder house with at least the forward portion of the conveyor means being movable toward or away from the bottom wall to decrease and increase the size, respectively, of the passage, the improvement comprising: abutment means connected to and movable with the forward portion of the conveyor means; rotatable pin means extending through a side wall of the feeder house; a stop member nonrotatably mounted on the pin means interiorly of the feeder house and in the path of movement of the abutment means so that contact between the stop member and abutment means determines the minimum size of the passage; the stop member having first and second stop surfaces spaced unequal distances from the axis of rotation of the pin means; and releasable fastener means acting between the exterior end of the pin means and the side wall of the feeder house to normally prevent rotation of the pin means, whereby, by releasing the fastener means, the pin means can be rotated to vary the minimum size of the passage to correspond to the crop being harvested.

4. A combination as set forth in claim 3 wherein an adjusting member is rotatably mounted on the side wall of the feeder house and carries an adjusting link which moves toward and away from the bottom wall of the feeder house upon rotation of the adjusting member; the pin means is rotatably carried by the adjusting link and extends through an elongated slot in the side wall of the feeder house, whereby rough adjustments in the minimum size of the passage can be made by rotating the pin means and fine adjustments can be made by rotation of the adjusting member.

5. A combination as set forth in claim 4 wherein the adjusting member is a circular cam rotatable about an eccentric axis and the adjusting link is provided with a corresponding circular aperture which receives the cam.

6. A combination as set forth in claim 5 wherein the cam is rotatably mounted on a bolt carried by the side wall of the feeder house, and a nut on the bolt releasably clamps the cam against the side wall of the feeder house in any adjusted position.

7. A combination as set forth in claim 6 wherein the outer end of the pin means is threaded, and the releasable fastener means includes a nut to clamp the stop member, side wall and adjusting link in fixed relative positions.

8. In a feeder house adapted to have its rear end pivotally connected to the main separator body of a harvesting implement and to support crop gathering means at its forward end, and including conveyor means extending from one end of the feeder house to the other and mounted therein to define a crop passage between the conveyor means and a bottom wall of the feeder house with at least the forward portion of the conveyor means being movable toward and away from the bottom wall of the feeder house to decrease and increase, respectively, the size of the passage, the improvement comprising: abutment means connected to and movable with the forward portion of the conveyor means; an adjusting member rotatably mounted on a side wall of the feeder house; a link member mounted on the adjusting member and movable toward and away from the bottom wall of the feeder house upon rotation of the adjusting member; pin means carried on the free end of the link means and projecting through an elongated slot provided in the side wall of the feeder house and into the path of movement of the abutment means, whereby, upon rotation of the adjusting member, the pin means will be moved toward or away from the bottom wall of the feeder house to decrease or increase, respectively, the minimum size of the passage.

9. The invention as set forth in claim 8 wherein releasable fastener means cat between the adjusting means and the side wall of the feeder house to selectively and releasably secure the adjusting means in any adjusted position.

10. The invention as set forth in claim 9 wherein the adjusting means includes a circular cam eccentrically and rotatably mounted on a bolt carried by the side wall, the link means is provided with a circular aperture which receives the cam, and the releasable fastener means includes a nut on the bolt for clamping the cam against the side wall of the feeder house.

11. The invention as set forth in claim 8 wherein the pin means is rotatably carried by the link means, a stop member is nonrotatably mounted on the pin means and has a peripheral stop surface with areas located unequal distances from the axis of rotation of the pin means, and releasable fastener means acts between the pin means and link member to releasably secure the pin means in any adjusted position so that any selected one of the stop surfaces on the stop means cooperates with the abutment means to determine the minimum size of the passage.

12. The invention as set forth in claim 11 wherein the pin means is threaded exteriorly of the feeder house, and the releasable fastener means acting between the pin means and link means includes a nut for clamping the link member and stop member against the side wall of the feeder housing.

* * * * *

UNITED STATES PATENT OFFICE
CERTIFICATE OF CORRECTION

Patent No. 3,699,753　　　　　　　Dated　24 October 1972

Inventor(s) Charles Benjamin Peak

It is certified that error appears in the above-identified patent and that said Letters Patent are hereby corrected as shown below:

Column 4, lines 54 and 55, cancel "and releasable fastener means cooperably among the pin means;"; line 58, before "releasing" insert -- by --.

Column 6, line 29, change "cat" to -- act --.

Signed and sealed this 8th day of May 1973.

(SEAL)
Attest:

EDWARD M. FLETCHER, JR.　　　　　ROBERT GOTTSCHALK
Attesting Officer　　　　　　　　Commissioner of Patents